Aug. 18, 1953
W. I. JONES
2,648,885
SNAP FASTENER SOCKET ASSEMBLY
Filed June 1, 1951
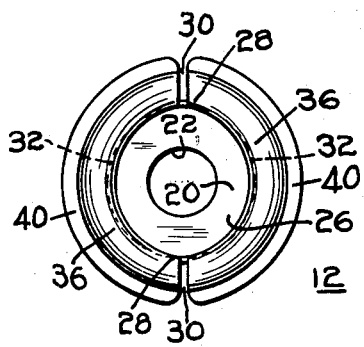
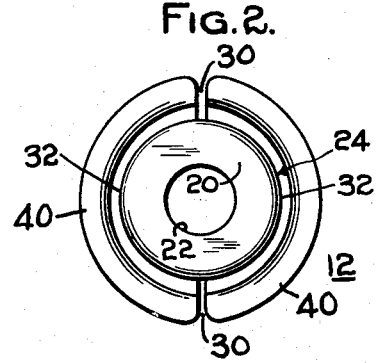
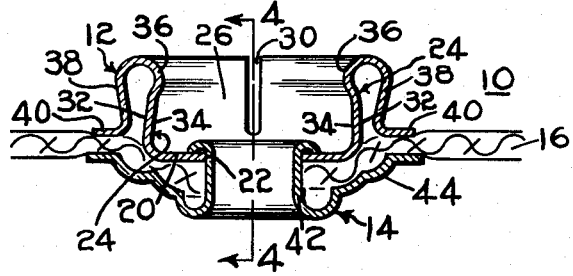
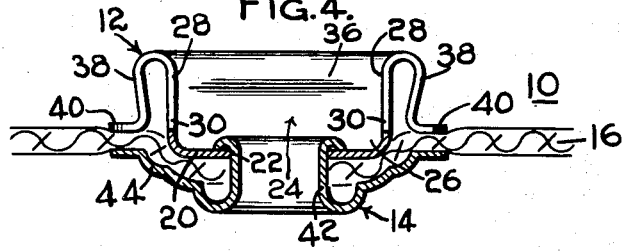
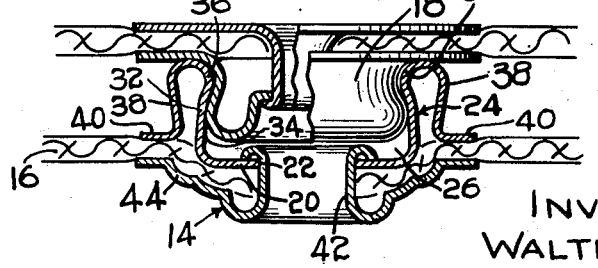
INVENTOR:
WALTER I. JONES,
BY Robert E Ross
AGENT.

Patented Aug. 18, 1953

2,648,885

UNITED STATES PATENT OFFICE 2,648,885

SNAP FASTENER SOCKET ASSEMBLY

Walter I. Jones, Belmont, Mass., assignor to United-Carr Fastener Corporation, Cambridge, Mass., a corporation of Massachusetts Application June 1, 1951, Serial No. 229,505

3 Claims. (Cl. 24—216)

This invention relates generally to snap fastener socket assemblies, and has particular reference to an improved snap fastener socket member of the springless type formed of a single piece of sheet metal.

The object of the invention is to provide a snap fastener socket member of the springless type in which a pair of opposing wall segments forming an elliptical stud-receiving opening are provided with wall support members extending about the wall to bear against the supporting sheet to which the socket is attached.

A further object of the invention is to provide a springless socket assembly comprising a socket member and an attaching member, in which the socket has wall segments disposed on a base to form an elliptical stud-receiving opening and wall support members having radial bearing flanges disposed above the plane of the base, and the attaching member has a generally conical flange portion to cooperate with the socket flange to grip a supporting sheet therebetween and to assist in resisting crushing forces imparted to the socket.

Another object of the invention is to provide a springless socket member having a pair of stud-engaging walls disposed on a base to form a stud-receiving cavity having an elliptical opening, in which each wall is provided with an outer support member for bearing against the supporting sheet to which the socket is attached to impart stiffness to the walls and to resist crushing forces applied thereto.

Other objects of the invention will, in part, be obvious, and will, in part, appear hereinafter.

In the drawing:

Fig. 1 is a top plan view of a socket member embodying the features of the invention;

Fig. 2 is a bottom plan view of the socket member of Fig. 1;

Fig. 3 is a view in section, partly in elevation, of the socket member of Fig. 1 attached to a supporting sheet;

Fig. 4 is a view in section taken on line 4—4 of Fig. 3; and

Fig. 5 is a view in section of the socket assembly of Fig. 3 and a stud member snapped into engagement therewith.

Referring to the drawing, there is illustrated a socket assembly 10, comprising a socket member 12 and an attaching member 14 assembled onto opposite sides of a supporting sheet 16, to receive a shouldered stud 18 in snapping engagement therewith.

The socket 12 is formed of a single piece of sheet metal such as brass or steel, and is provided with a base 20, having a central opening 22, for seating against the supporting sheet 16, and an upstanding peripheral wall 24 disposed on the base forming a stud-receiving cavity 26. The wall 24 has a pair of opposing portions 28 which extend substantially normal to the plane of the base, and a pair of opposing vertical slots 30 are disposed in the vertical portions, thereby forming the wall into a pair of opposing stud-engaging portions 32. The central portions 34 of the stud-engaging wall portions 32 are inclined inwardly toward each other, and are provided with inwardly extending lip portions 36 disposed near the opening to the cavity 26. The angle of inclination relative to the base of the stud-engaging wall portions is greatest at the medial portion, and decreases gradually toward the slots, where the wall is substantially vertical to the base. Similarly, the lip portions 36 project inwardly the greatest distance at the medial portion of the stud-engaging segments, with the distance decreasing toward the slots, until substantially no lip is present immediately adjacent the slots. Consequently, the entrance to the stud-receiving cavity 26 is generally oval or elliptical in shape, so that when the stud 18 is inserted therein the stud-engaging portions must flex outwardly away from each other to allow the stud shoulder to pass behind the lips 36.

To resist such outward flexing each stud-engaging portion is provided with a support portion 38 which extends downwardly from the upper edge of the wall in spaced relation thereto. The support portions 38 conform generally to the shape of the wall, and are each provided with a radially extending flange 40 disposed on the lower edge for seating against the sheet when the socket is assembled thereon. The flanges 40 are preferably spaced upwardly from the plane of the base for a purpose to appear hereinafter.

The attaching member 14 comprises a hollow barrel 42 and a flange 44 disposed on one end thereof. In the preferred embodiment the flange is inclined away from the end of the barrel to which it is attached to give a generally conical shape thereto so that the periphery of the flange is disposed intermediate the ends of the barrel.

To assemble the device, the socket 12 is seated against the sheet 16 on one side, and the barrel of the attaching member is inserted through the sheet from the other side into the opening 22 in the base. As the parts are forced tightly together, the end of the barrel is curled in the cavity 26 against the base 20 to retain the parts on the sheet.

The conical flange 44 forces the supporting sheet 16 against the base of the socket and upwardly about the periphery of the base against the bearing flanges 40 on the socket. The outer periphery of the base is disposed opposite the bearing flanges so that the sheet is firmly gripped therebetween.

When the stud 18 is inserted into the socket, the stud-engaging portions 32 must flex outwardly to allow the stud shoulder to pass the lip portions 36. Such outward flexing is resisted by the support portions 38 to give a strong snapping action to the fastener. The support portions also strengthen the fastener so as to resist crushing forces applied thereto during use, or during laundering.

Since the fastener is provided with only two stud-engaging portions which are disposed opposite each other, the fastener may be formed of a blank which is nearly rectangular with very little waste metal.

Since certain obvious changes may be made in the device without departing from the scope of the invention, it is intended that all matter contained herein be interpreted in an illustrative and not in a limiting sense.

I claim:

1. A snap fastener socket member for snap fastener engagement with a shouldered stud, comprising a base for attachment to a supporting sheet and an upstanding circumferential wall disposed on the base, opposing portions of said wall being substantially vertical to the plane of the base, and other opposing portions of the well between said vertical portions being inclined inwardly toward each other and having shoulders spaced from the base and shaped to form an elliptical stud-receiving opening, said wall having opposing vertical slots disposed on said opposing vertical portions thereby forming opposing stud-engaging wall segments defining an elliptical stud opening, each wall segment having an individual wall support member extending downwardly from the upper ends of each wall segment in spaced relation to the wall toward the plane of the base, and a support flange disposed on the lower end of the wall support member for bearing against the support to resist crushing forces applied to the socket.

2. A snap fastener socket member for snap fastener engagement with a shouldered stud comprising a base for attachment to a supporting sheet, an upstanding circumferential inner wall disposed on the base, and a circumferential outer wall extending downwardly from the upper edge of the inner wall toward the plane of the base, and a radially extending flange disposed on the lower edge of the outer wall to bear against the supporting sheet when the socket is attached thereto, said inner wall having a pair of opposing portions which are substantially vertical to the plane of the base, the portions of the inner wall between said pair of vertical portions being inclined inwardly toward each other and having shoulder members disposed near the upper edge thereof to form an elliptical stud-receiving opening, and a pair of vertical slots disposed in the opposing vertical portions of the inner wall, said slots extending through the outer wall and the flange, thereby forming the socket walls into two opposing stud-engaging segments.

3. In a snap fastener socket assembly, a socket member and an attaching member for assembly onto opposite sides of a supporting sheet, said socket member comprising a base for seating against the sheet, an inner stud-engaging wall peripherally disposed on the base, an outer support wall extending downwardly from the upper edge of the inner wall toward the plane of the base, and a radially extending flange disposed on the lower edge of the outer wall, said flange being disposed above the plane of the base, said inner wall having a pair of opposing portions which are substantially vertical to the plane of the base, the portions of the inner wall between said vertical portions being inclined inwardly toward each other and having shoulder members disposed near the upper edge thereof to form an elliptical stud-receiving opening, and a pair of vertical slots disposed in the opposing vertical portions of the inner wall, said slots extending through the outer wall and the flange thereby forming the socket walls into two opposing stud-engaging segments; said attaching member having a central portion for extending through the supporting sheet for engagement with the socket base, and a flange disposed on one end of the center portion extending outwardly therefrom and being inclined toward the other end of the central portion, whereby when said other end of the central portion is engaged with the socket, the outer periphery of the flange bears against the supporting sheet and forces it upwardly about the socket base into engagement with the socket flange so that the sheet is firmly gripped therebetween and said flange on the attaching member assists in supporting the socket flange.

WALTER I. JONES.

References Cited in the file of this patent

UNITED STATES PATENTS

| Number | Name | Date |
|---|---|---|
| 772,158 | Lane | Oct. 11, 1904 |
| 1,732,837 | Fenton | Oct. 22, 1929 |
| 1,832,830 | Fenton | Nov. 17, 1931 |

FOREIGN PATENTS

| Number | Country | Date |
|---|---|---|
| 545,892 | Great Britain | June 17, 1942 |